US012574539B2

(12) United States Patent
Su et al.

(10) Patent No.: US 12,574,539 B2
(45) Date of Patent: Mar. 10, 2026

(54) MOTION ESTIMATION AND MOTION COMPENSATION (MEMC) SYSTEM WITH CORRECTION FUNCTION AND METHOD FOR CALIBRATING PARAMETERS THEREOF

(71) Applicant: REALTEK SEMICONDUCTOR CORP., Hsinchu (TW)

(72) Inventors: Li-Heng Su, Hsinchu (TW); Chih-Shun Fan Chiang, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 0 days.

(21) Appl. No.: 18/893,586

(22) Filed: Sep. 23, 2024

(65) Prior Publication Data

US 2025/0234026 A1     Jul. 17, 2025

(30) Foreign Application Priority Data

Jan. 12, 2024     (TW) ................................. 113101448

(51) Int. Cl.
H04N 19/51     (2014.01)
H04N 7/01     (2006.01)

(52) U.S. Cl.
CPC ........... H04N 19/51 (2014.11); H04N 7/0127 (2013.01)

(58) Field of Classification Search
CPC ..... H04N 19/51; H04N 7/0127; H04N 19/176
See application file for complete search history.

(56) References Cited

U.S. PATENT DOCUMENTS

| | | | | |
|---|---|---|---|---|
| 8,243,790 | B2 * | 8/2012 | Leontaris ............. | H04N 19/107 |
| | | | | 375/E7.243 |
| 8,750,372 | B2 * | 6/2014 | Leontaris ............. | H04N 19/553 |
| | | | | 382/162 |
| 11,343,526 | B2 * | 5/2022 | Wang ................... | H04N 19/176 |
| 11,743,463 | B2 * | 8/2023 | Henry ................. | H04N 19/167 |
| | | | | 375/240 |
| 2009/0034622 | A1 * | 2/2009 | Huchet ................ | H04N 19/182 |
| | | | | 375/E7.193 |
| 2009/0086814 | A1 * | 4/2009 | Leontaris ............. | H04N 19/553 |
| | | | | 375/E7.243 |
| 2009/0086816 | A1 * | 4/2009 | Leontaris ............... | H04N 19/14 |
| | | | | 375/E7.193 |

(Continued)

FOREIGN PATENT DOCUMENTS

| | | |
|---|---|---|
| TW | 201004361 A | 1/2010 |
| TW | I678914 B | 12/2019 |

*Primary Examiner* — Justin W Rider
(74) *Attorney, Agent, or Firm* — Birch, Stewart, Kolasch & Birch, LLP

(57) ABSTRACT

A motion estimation and motion compensation (MEMC) system with calibration function and a parameter calibration method thereof relate to a parameter calibration method for MEMC. The parameter calibration method is configured to calibrate an MEMC program. The parameter calibration method includes storing a default feature set; performing the MEMC program on a calibrated video to fetch a testing feature set; generating a calibration parameter according to a difference vale between the default feature set and the testing feature set; and adjusting a correction parameter of the MEMC calibration program in accordance with the calibration parameter.

16 Claims, 8 Drawing Sheets

(56)         References Cited

U.S. PATENT DOCUMENTS

2011/0310295 A1* 12/2011 Chen .................... H04N 19/577
                                                        348/E7.003
2012/0275514 A1* 11/2012 Leontaris ............. H04N 19/172
                                                        375/E7.125
2017/0308998 A1* 10/2017 Wang ...................... G06T 7/223
2022/0103852 A1*  3/2022 Wang ................... H04N 19/139

* cited by examiner

150A

150A

150A

150A

150A

150A

150A

150A

150A

MOTION ESTIMATION AND MOTION COMPENSATION (MEMC) SYSTEM WITH CORRECTION FUNCTION AND METHOD FOR CALIBRATING PARAMETERS THEREOF

CROSS-REFERENCE TO RELATED APPLICATION

This non-provisional application claims priority under 35 U.S.C. § 119 (a) to patent application No. 113101448 filed in Taiwan, R.O.C. on Jan. 12, 2024, the entire contents of which are hereby incorporated by reference.

BACKGROUND

Technical Field

The instant disclosure relates to an electronic system and a processing method for calibrating digital videos, in particular to a motion estimation and motion compensation system with correction function and a parameter calibration method thereof.

Related Art

Motion estimation and motion compensation (MEMC) is a technology for video frame interpolation, which is able to allow a low-frame rate video to be played with a higher frame rate. Therefore, motions in a video can be made smoother.

As MEMC algorithms are iteratively updated, updated video processing chips are applied to new video playing products (for example: a monitor or a playing program). Because the MEMC algorithms (or the chips with the MEMC algorithms) adopted by video playing products from different generations (or product lines) may differ from each other, the digital videos after compensation may also differ from each other for different products.

SUMMARY

In an embodiment, a motion estimation and motion compensation (MEMC) system with correction function comprises a storage unit, an MEMC unit, and a processing unit. The storage unit is configured to store a default feature set of at least one specified pattern feature. The MEMC unit is configured to receive a calibrated video and perform an MEMC program on the calibrated video so as to fetch a testing feature set. The processing unit is connected to the storage unit and the MEMC unit and configured to generate a calibration parameter in accordance with a difference value between the default feature set and the testing feature set. The MEMC unit is further configured to correct an output result of the MEMC program in accordance with the calibration parameter.

In an embodiment, the MEMC system further comprises a video source. The video source is connected to the MEMC unit and configured to output the calibrated video to the MEMC unit. The calibrated video has at least one frame feature. The MEMC unit fetches the testing feature set in accordance with the at least one frame feature of the calibrated video.

In an embodiment, the video source is an image generator, and the at least one specified pattern feature comprises a plurality of specified pattern features. The image generator generates a specified video having the specified pattern features as the calibrated video in accordance with a pattern feature table. The specified pattern features are generated in sequence and have different extents of details.

In an embodiment, the video source is a media player. The media player outputs a specified video as the calibrated video.

In an embodiment, the MEMC unit fetches at least one of the at least one specified pattern feature from the calibrated video, calculates a testing feature value of each fetched one of the at least one specified pattern feature, and records the testing feature value of each fetched one of the at least one specified pattern feature to the testing feature set.

In an embodiment, the storage unit stores an information table, the information table records the default feature set of the at least one specified pattern feature, and the processing unit comprises a comparison unit and a calibration unit. The comparison unit is connected to the MEMC unit and configured to calculate a difference value between the testing feature value and the default feature set. The calibration unit is connected to the comparison unit and configured to verify the difference value in accordance with a threshold value. In response to that the difference value is greater than the threshold value, the calibration unit performs a linear regression program in accordance with the testing feature set and the default feature set so as to generate the calibration parameter.

In some embodiments, the calibration unit first performs the linear regression program on the testing feature value and the default feature set so as to obtain a temporary feature set, and then performs a least squares program on the temporary feature set so as to generate the calibration parameter.

In an embodiment, a parameter calibration method for MEMC comprises: storing a default feature set; performing a MEMC program on a calibrated video so as to fetch a testing feature set; generating a calibration parameter in accordance with a difference value between the default feature set and the testing feature set; and adjusting a correction parameter of the MEMC program in accordance with the calibration parameter.

In some embodiments, the parameter calibration method further comprises: connecting to a video source; and receiving the calibrated video provided by the video source. The calibrated video has a specified pattern feature, and a default detail set comprises a default feature value of the specified pattern feature.

In some embodiments, the parameter calibration method further comprises: loading a pattern feature table; and generating a specified video having a plurality of specified pattern features as the calibrated video in accordance with a pattern feature table. The specified pattern features are generated in sequence and have different extents of details.

In an embodiment, the step of performing the MEMC program on the calibrated video so as to fetch the testing feature set comprises: fetching at least one specified pattern feature from the calibrated video; calculating a testing feature value of each of the at least one specified pattern feature; and establishing the testing feature set based on the testing feature value of the at least one specified pattern feature.

In an embodiment, the default feature set is recorded in an information table, and the step of adjusting the correction parameter of the MEMC program in accordance with the calibration parameter comprises adjusting the information table in accordance with the calibration parameter so as to generate a correction correspondence table.

In an embodiment, the parameter calibration method further comprises: loading a pattern feature table; and generating a specified video having a plurality of specified pattern features as the calibrated video in accordance with a pattern feature table. The specified pattern features are generated in sequence and have different extents of details.

In an embodiment, the step of generating the calibration parameter in accordance with the difference value between the default feature set and the testing feature set comprises: performing a linear regression program on the testing feature value and the default feature set so as to obtain a temporary feature set; and performing a least squares program on the temporary feature set so as to generate the calibration parameter.

In an embodiment, the step of performing the linear regression program on the testing feature value and the default feature set so as to obtain the temporary feature set comprises: forming an initial group point distribution using the testing feature set and the default feature set; and verifying and removing outliers in the initial group point distribution so as to obtain the temporary feature set.

In an embodiment, the parameter calibration method further comprises: receiving an input video; and performing the motion estimation and motion compensation system (MEMC) program on the input video in accordance with the calibration parameter so as to generate a compensated video.

As above, according to any of the foregoing embodiments, the MEMC system with correction function and the parameter calibration method thereof provide automatic calibration processing of the MEMC technology. As a result, a correction parameter configured to correct an output result of the MEMC program during normal operation can be generated. Consequently, MEMC algorithms (or chips applying the MEMC algorithms) in different devices can output identical compensation result. Further, working burden of developers can be reduced, and development cost can be lowered. Moreover, after firmware or software versions are updated, compensation results of the MEMC algorithms from different generations can approach consistency.

BRIEF DESCRIPTION OF THE DRAWINGS

The instant disclosure will become more fully understood from the detailed description given herein below for illustration only, and therefore not limitative of the instant disclosure, wherein.

DETAILED DESCRIPTION

Figure 1:
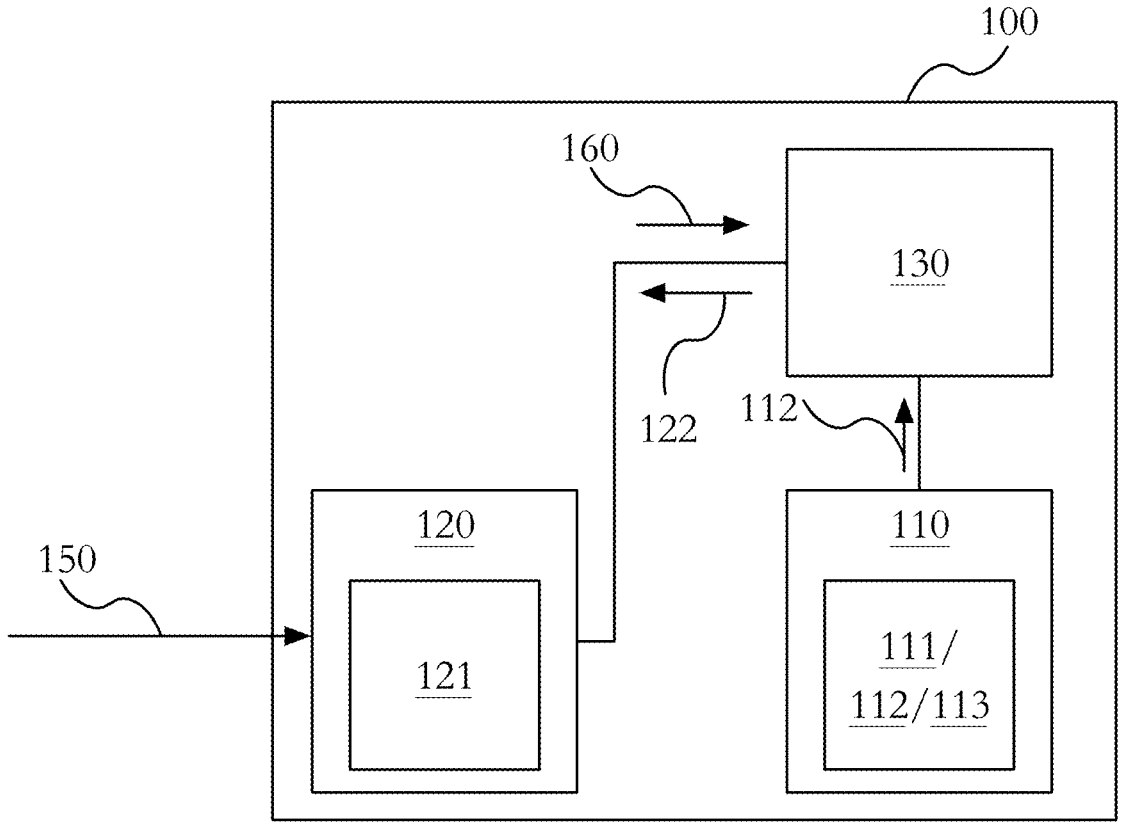
FIG. 1 illustrates a structural diagram of an MEMC system with correction function according to an embodiment.

Please refer to FIG. 1. A motion estimation and motion compensation system (simplified as compensation system 100 hereinafter) includes a storage unit 110, a motion estimation and motion compensation (MEMC) unit 120, and a processing unit 130. The processing unit 130 is electrically connected to the storage unit 110 and the MEMC unit 120. In an embodiment, the compensation system 100 can be applied to a video processing chip or a combination of a video processing chip and a media player.

The storage unit 110 is configured to store a default feature set 112. The default feature set 112 includes a plurality of default feature values 113 (golden values). The default feature values 113 are default feature values 113 of specified pattern features obtained by processing a target video with an expected MEMC algorithm, and the default feature values 113 are stored in the storage unit 110 in advance. In general, the expected MEMC algorithm indicates that a compensation effect presented by a video processed by the MEMC algorithm meets the expectation of the designer (for example, compensation effects of different video processing chips on the same video are substantially identical).

In some embodiments, the default feature set 112 can be stored in the storage unit 110 in the form of an information table 111. In other words, in some embodiments, the storage unit 110 stores the information table 111 having the target video, and one or more specified pattern features of the default target video and the default feature values 113 (i.e., the default feature set 112) of the specified pattern features are recorded in the information table 111. Further, the storage unit 110 is able to store a variety of target videos and a variety of information tables 111 corresponding to the target videos.

In general, the target video has at least one frame of video frame. Here, the target video may be, for example, a checkered video having different pitches, a checkered video having differently colors in different regions, or a video having a moving object. Further, the target video may be, but not limited to, a video having a moving object or a still image. For example, in the case that the target video is a still image, the target video may be a checkered image, a landscape painting, an animal painting, or a building painting. On the other hand, in the case that the target video is a video having a moving object, the target video may be a video of a sport tournament, a video of car racing, or a video of a moving animal.

Figure 8:
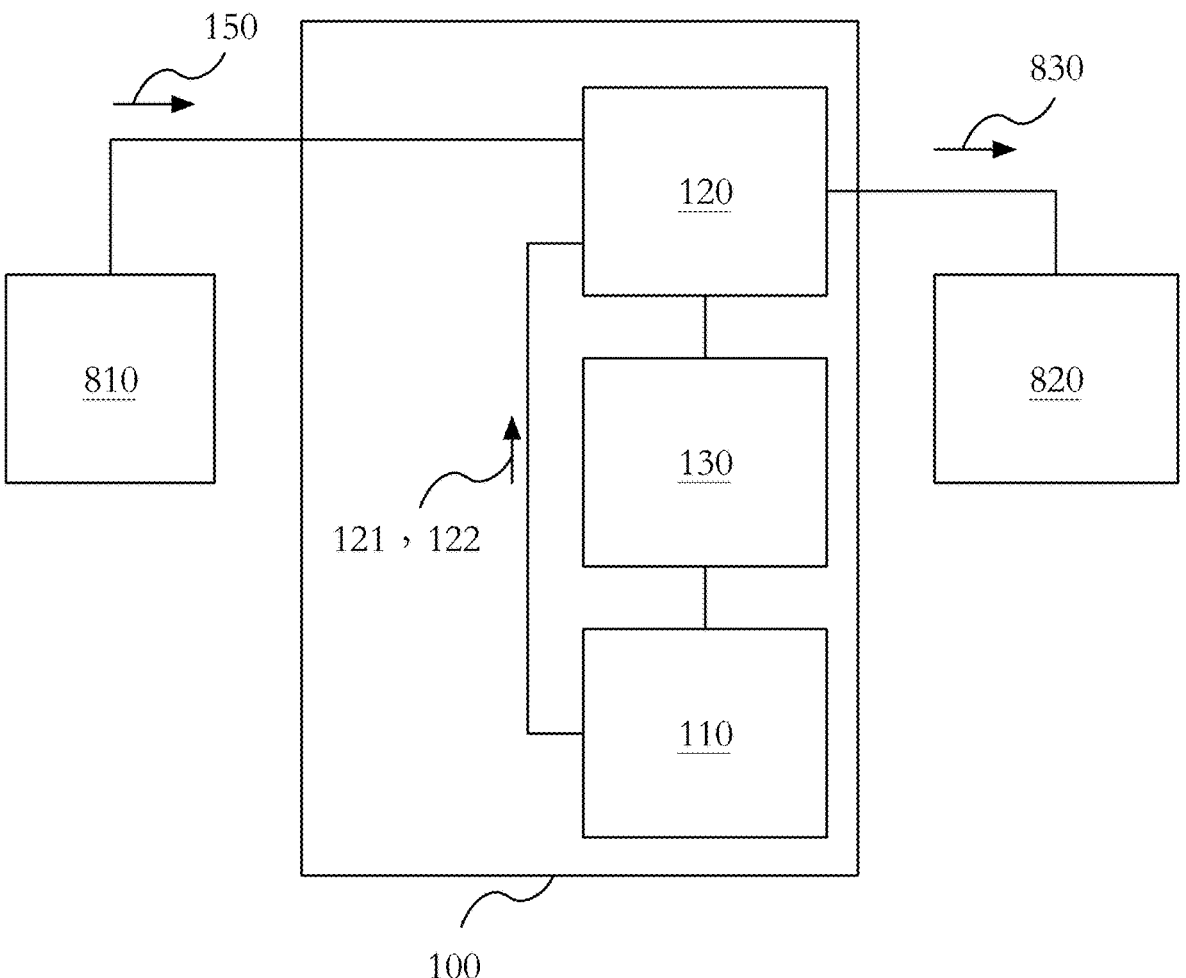
FIG. 8 illustrates a structural diagram of a compensation system and a display according to an embodiment.

The MEMC unit 120 has an MEMC program 121. Under normal operation (i.e., normal mode), the MEMC unit 120 performs compensation on an input video which is inputted to the compensation system 100 through performing the MEMC program 121. Therefore, a number of frames of an output video is adjusted (increased). Then, the post-compensation video 830 which has been generated is provided to a display 820 for displaying, as shown in FIG. 8. Further, the storage unit 110 further stores the MEMC program 121. In response to that the compensation system 100 is started, the MEMC unit 120 reads the MEMC program 121 from the storage unit 110 and loads the MEMC program 121 for subsequent compensation on the input video.

In this embodiment, the MEMC program 121 and the expected MEMC algorithm are MEMC algorithms of different versions or MEMC algorithms of different types. In some embodiments, the MEMC unit 120 may be a software MEMC algorithm (i.e., the MEMC program 121) or a hardware circuit running an MEMC program.

In order to ensure that the applied products have consistent (or up-to-expectation) compensation effects, the compensation system 100 first performs a calibration of a correction parameter of the MEMC program 121. In other words, the compensation system 100 has an operation mode and a calibration mode.

Figure 2:
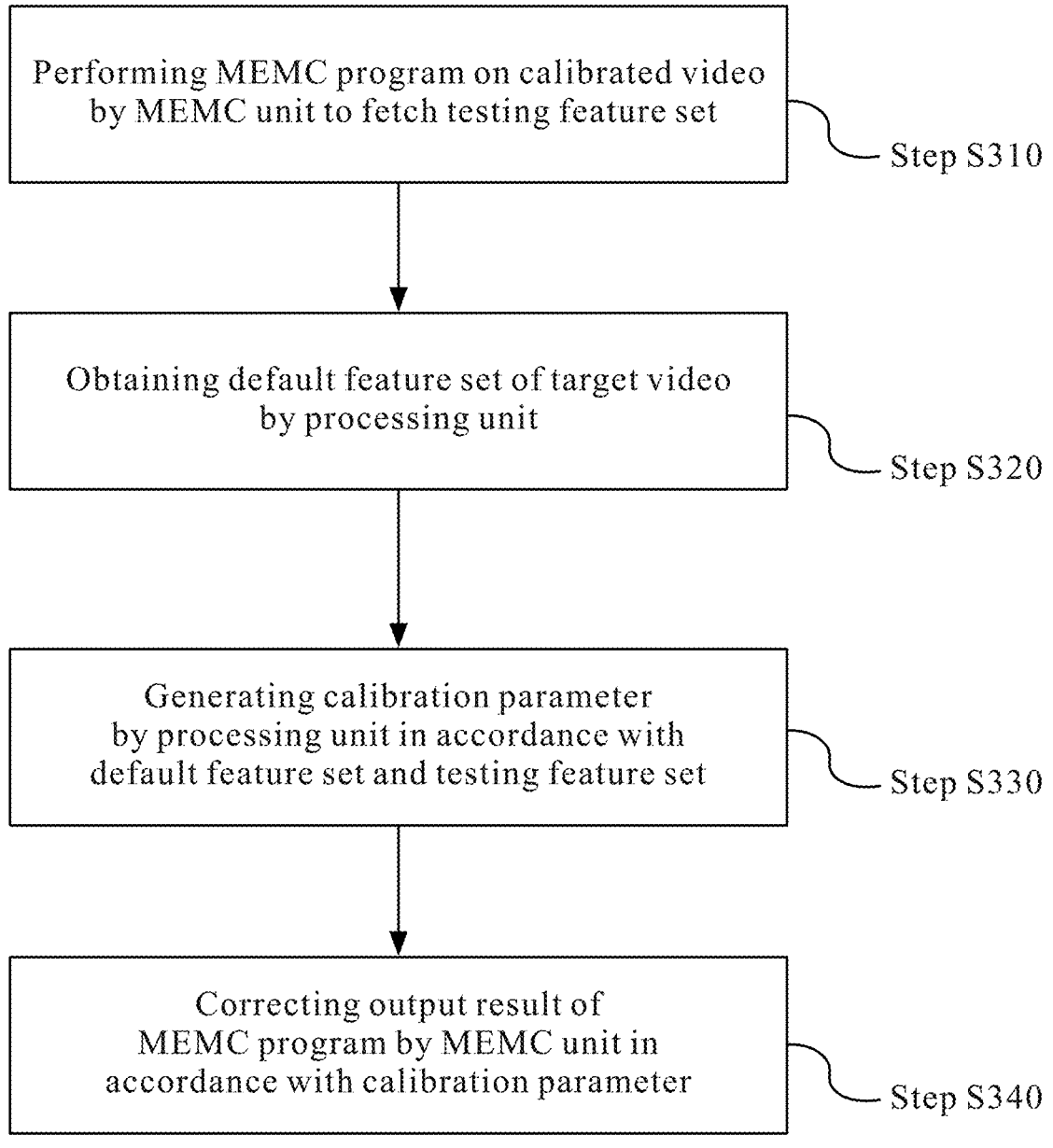
FIG. 2 illustrates a flow chart of a parameter calibration method for MEMC according to an embodiment.

Please refer to FIG. 1 and FIG. 2. Under the calibration mode, the MEMC unit 120 receives a calibrated video 150, and the MEMC unit 120 performs the MEMC program 121 on the calibrated video 150 to generate a testing feature set 160 of the calibrated video 150 (step S310).

In some embodiments, the MEMC unit 120 fetches one or more specified pattern features from the calibrated video 120, calculates extents of details of each fetched one of the specified pattern features to obtain a testing feature value, and then form a testing feature set 160 using the testing feature values of all of the fetched ones of the specified pattern features. In other words, in some embodiments, the testing feature set 160 includes the testing feature values of one or more specified pattern features.

In some embodiments, the specified pattern features may be pattern details, pattern sizes, pattern edges, colors, motion speeds of the calibrated video 150, or a combination thereof. For example, please refer to FIG. 5A through FIG. 5I, where a checkered video 150A is exemplified as the calibrated video 150. At this time, the specified pattern feature may be the pitch of the checkered pattern. In response to that the MEMC unit 120 performs the MEMC program 121 on the calibrated video 150, the MEMC unit 120 can perform analysis on the calibrated video 150 so as to find the pitch of the checkered pattern in the calibrated video 150. Besides, the MEMC unit 120 can calculate the size of the pitch of the checkered pattern so as to obtain the testing feature value. In other embodiments, a different number of patterns may be selected for the calculation for the MEMC program 121.

Figure 3:
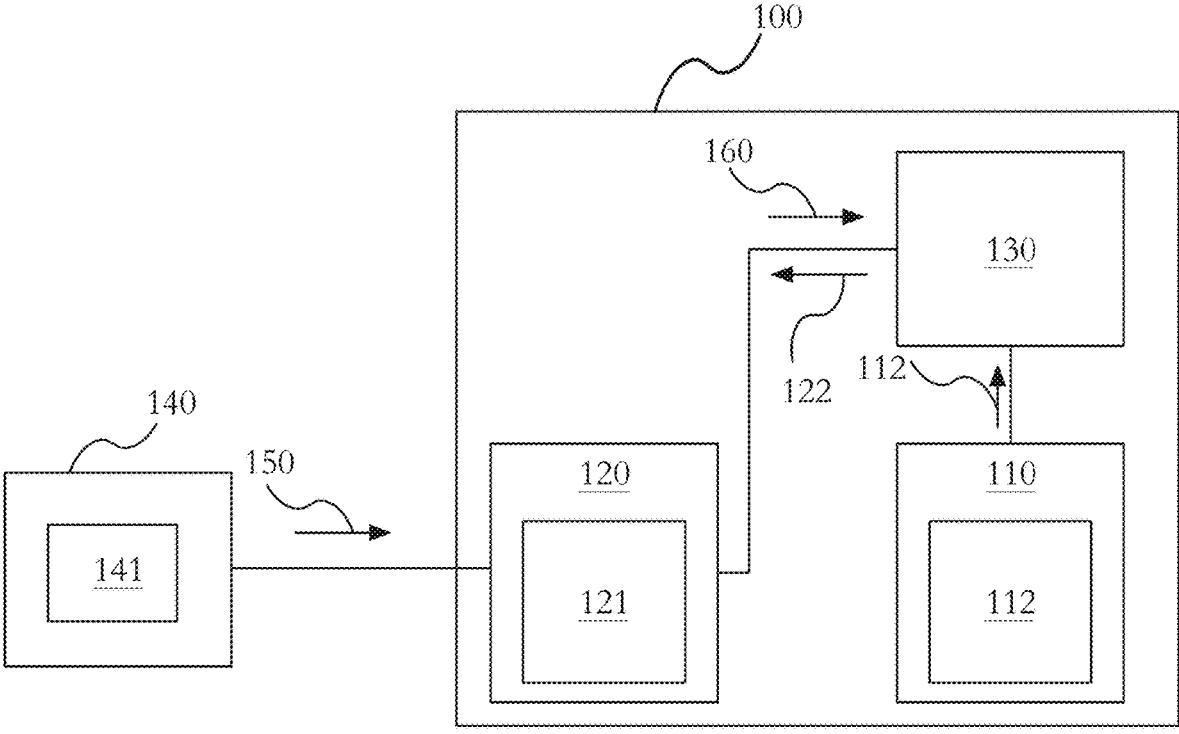
FIG. 3 illustrates a structural diagram of an exemplary embodiment of the MEMC system of FIG. 1.
Figure 4:
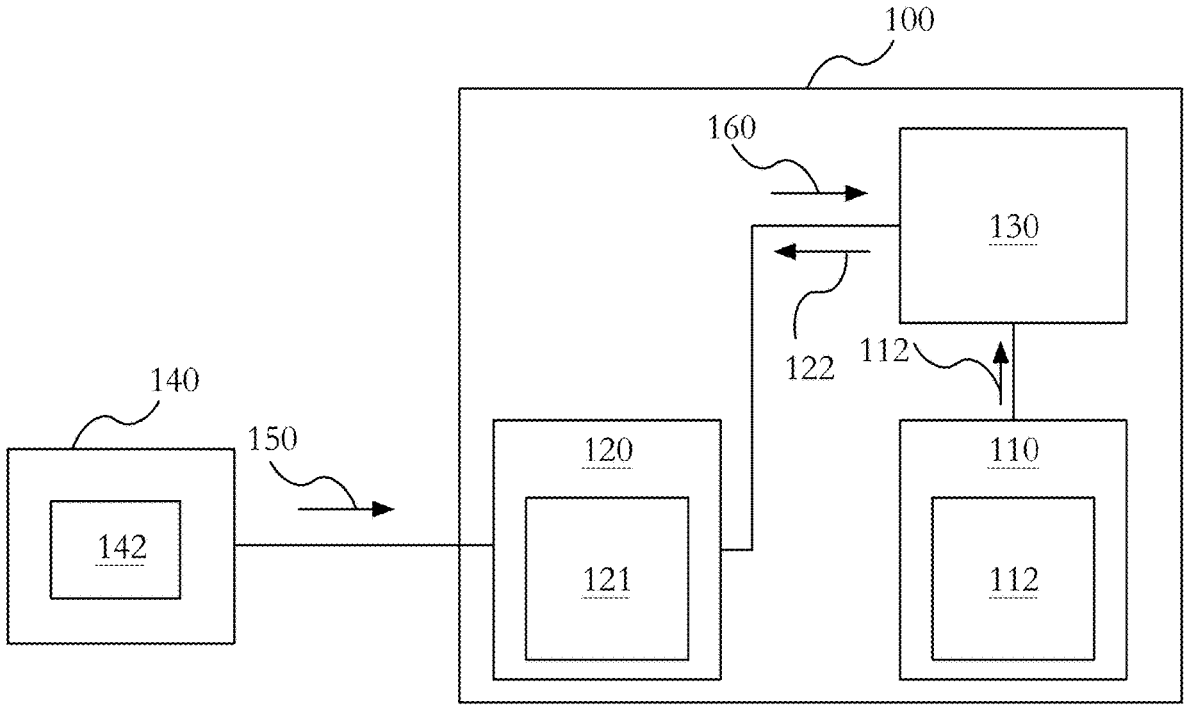
FIG. 4 illustrates a structural diagram of another exemplary embodiment of the MEMC system of FIG. 1.
Figures 5A, 5B, 5C, 5D, 5E, 5F, 5G, 5H, 5I:
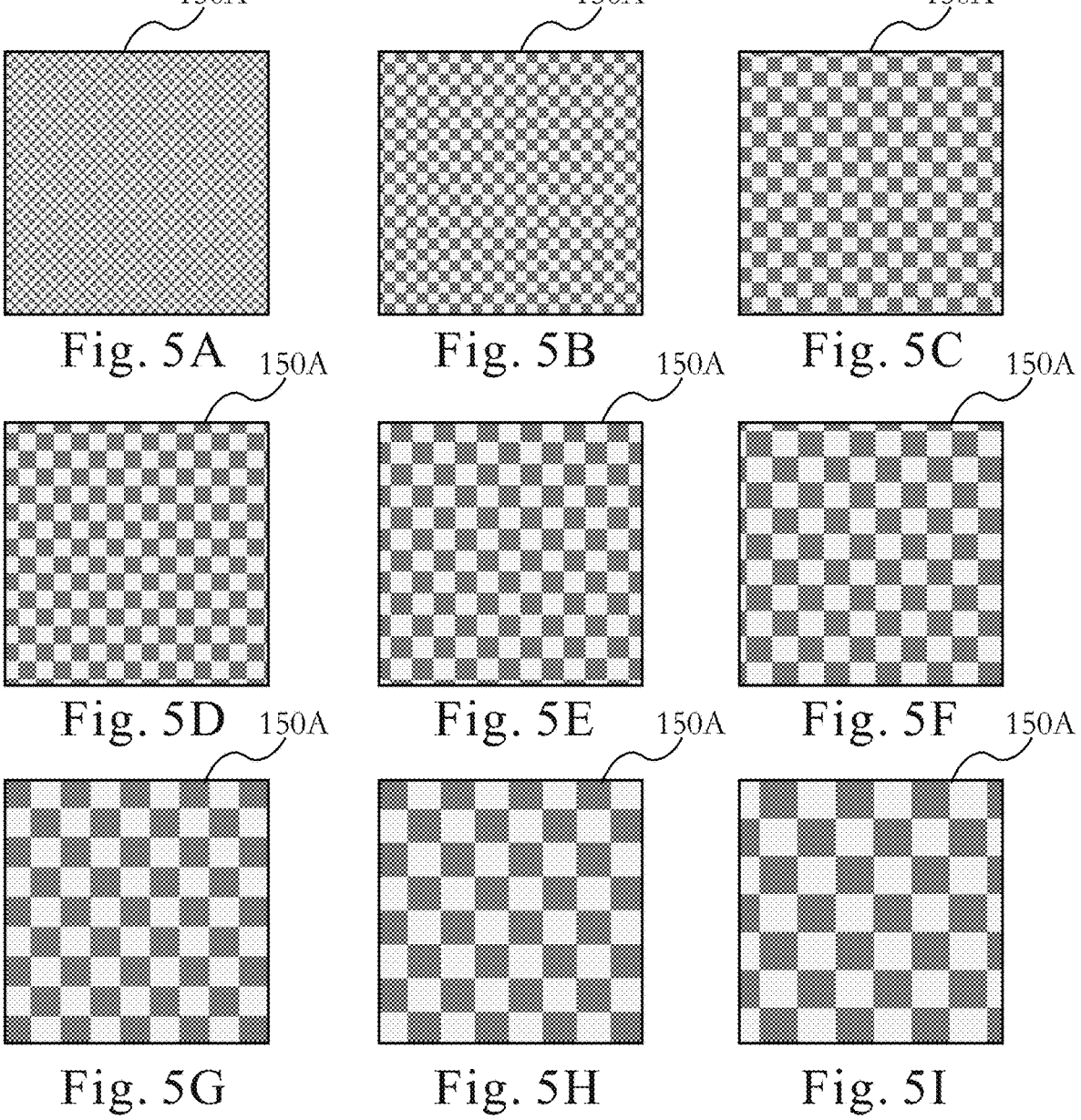
FIG. 5A illustrates a calibrated video of a checkered pattern with a pitch according to an embodiment.
FIG. 5B illustrates a calibrated video of a checkered pattern with another pitch according to an embodiment.
FIG. 5C illustrates a calibrated video of a checkered pattern with another pitch according to an embodiment.
FIG. 5D illustrates a calibrated video of a checkered pattern with another pitch according to an embodiment.
FIG. 5E illustrates a calibrated video of a checkered pattern with another pitch according to an embodiment.
FIG. 5F illustrates a calibrated video of a checkered pattern with another pitch according to an embodiment.
FIG. 5G illustrates a calibrated video of a checkered pattern with another pitch according to an embodiment.
FIG. 5H illustrates a calibrated video of a checkered pattern with another pitch according to an embodiment.
FIG. 5I illustrates a calibrated video of a checkered pattern with another pitch according to an embodiment.

In some embodiments, the MEMC unit 120 is connected to a video source 140. The video source 140 outputs the calibrated video 150 to the MEMC unit 120. The calibrated video 150 has one or more specified pattern features. In this embodiment, the specified pattern feature is the pattern detail, the pattern size, the pattern edge, the color, the motion speed of the calibrated video 150, or a combination thereof. In other words, in some embodiments, the video feature and the specified pattern feature are feature categories of the same type. In this embodiment, the video source 140 may be an image generator 141 which is built in the compensation system 100 (as shown in FIG. 3) or a media player 142 external to the compensation system 100 (as shown in FIG. 4). In other words, in some embodiments, the calibrated video 150 received by the MEMC unit 120 may be generated by the image generator 141 which is built in the compensation system 100 voluntarily (as shown in FIG. 3). Alternatively, in some embodiments, the calibrated video 150 received by the MEMC unit 120 may come from the exterior of the compensation system 100 (as shown in FIG. 4).

In some embodiments, please refer to FIG. 3, the compensation system 100 may further include the image generator 141, and the image generator 141 is connected to the MEMC unit 120. The image generator 141 is configured to generate the calibrated 150 having the specified pattern feature. Specifically, in this embodiment, the storage unit 110 further stores a pattern feature table (not illustrated in the drawings). The image generator 141 loads the pattern feature table and generates a specified video having the specified pattern features as the calibrated video 150 in accordance with a pattern feature table. The specified pattern features are generated in sequence and have different extents of details.

For example, the image generator 141 generates one frame of specified frame having the specified pattern features. Then, the image generator 141 determines selected ones of the specified pattern features in accordance with the pattern feature table. Further, the image generator 141 adjusts the extents of details of the selected ones of the specified pattern features in this frame of the specified frame in sequence so as to generate a plurality of frames of the specified frames having different extents of details. Last, the image generator 141 outputs the specified video constituted by the frames of the specified frames as the calibrated video 150 to the MEMC unit 120. For example, the image generator 141 can generate multiple sets of calibrated videos 150, and the calibrated videos 150 are default videos of checkered videos 150A having different pitches, or are default videos of checkered videos 150A having different colors in different regions, or are default videos of checkered videos 150A having both different pitches and different colors in different regions, as shown in FIG. 5A through FIG. 5I. FIG. 5A through FIG. 5I illustrate checkered videos 150A (i.e., the calibrated videos 150) having different pitches. In some embodiments, the pattern feature table may record a correspondence relationship between one or more specified pattern features and each of the specified videos as well as relevant generation parameters thereof.

In some embodiments, referring to FIG. 4, the MEMC unit 120 may be connected to a media player 142 which is external to the compensation system 100. In this case, the media player 142 can output a plurality of frames of the specified frames having the specified pattern features (i.e., the calibrated video 150) to the MEMC unit 120, where the specified pattern features have different extents of details. For example, taking an example where the specified pattern feature is the moving speed of the frame, after the MEMC unit 120 receives the specified frames outputted by the media player 142, the MEMC unit 120 calculates the moving speeds of each frame of the specified frames as the testing feature value. In some embodiments, the media player 142 may be a personal computer, a CD-ROM/DVD-ROM, or other media players. The media player 142 can provide different forms of calibrated videos 150. For example, the media player 142 can play the calibrated video 150 such as a video of a sport tournament, a video of car racing, or a video of a moving animal.

Next, the MEMC unit 120 transmits the testing feature set 160 to the processing unit 130. Besides, the processing unit 130 loads the default feature sets 112 which has been stored in the storage unit 110 in advance so as to obtain a corresponding one of the default feature sets 112 (step S320). Then, the processing unit 130 calculates a difference value between the default feature set 112 and the testing feature set 160, and the processing unit 130 generates the calibration parameter in accordance with the difference value.

Specifically, in some embodiments, the processing unit 130 calculates the difference value between each of the testing feature values in the testing feature set 160 and a corresponding one of the default feature values 113 in the default feature set 112. Besides, the processing unit 130 determines whether calibration is needed to be performed in accordance with the difference value. If any of the difference values is too great (such as larger than or equal to a threshold value), the processing unit 130 further generates the calibration parameter in accordance with the default feature set 112 and the testing feature set 160 (step S330). On the contrary, if all of the difference values meet a standard (such as less than a threshold), this indicates that the compensations result outputted by the MEMC unit 120 meets the expectation. Last, the processing unit 130 adjusts the correction parameter of the MEMC program 121 in accordance with the calibration parameter which has been generated.

For example, taking the checkered videos 150A (i.e., the calibrated videos 150) of FIG. 5A through FIG. 5I as examples, referring to FIG. 1 and FIG. 5A through FIG. 5I, the video source 140 selects "detail" as the variable (i.e., the pattern feature) of the calibrated video 150. Regarding the checkered videos 150A, the extents of details may be the size of the pitches of the checkered patterns. The video source outputs the checkered videos 150A having different pitches of the checkered patterns to the MEMC unit 120. The MEMC unit 120 calculates the "numbers" of "details" in the calibrated video 150 in accordance with the MEMC algorithm on the MEMC unit 120. Besides, the MEMC unit 120 outputs the numbers of details (i.e., the testing feature values) which have been calculated to the processing unit 130. The processing unit 130 then compares the numbers of details which have been obtained through calculation and target numbers corresponding to the numbers of details (i.e., the default feature values 113) so as to determine whether calibration is needed to be performed.

It should be understood that, in some embodiments, after the step S330, the compensation system 110 may determine whether the calibration is effective through repeatedly performing the step S310 through the step S330. In other words, in some embodiments, the compensation system 100 repeatedly performs the step S310 through the step S330, until all of the difference values of the calibrated video 150 meet the standard.

In some embodiments, the calibrated video 150 and the target video which are compared with each other by the processing unit 130 (when the processing unit 130 calculates the difference values between the default feature set 112 corresponding to the target video and the testing feature set 160 corresponding to the calibrated video) may be videos of a same type. For example, in some embodiments, the calibrated video 150 and the target video are both checkered videos.

In some embodiments, the calibration parameters may be recorded in a correction correspondence table 122. Specifically, in some embodiments, after the processing unit 130 generates the calibration parameter of each of the specified pattern features, the processing unit 130 records the calibration parameters which have been generated as the correction parameters in the correction correspondence table 122. Then, the processing unit 130 outputs the correction correspondence table 122 to the MEMC unit 120. The MEMC unit 120 can then perform correction on the output result of the MEMC program 121 in accordance with the correction correspondence table 122. In some embodiments, the correction correspondence table 122 may be stored in the storage unit 110. In this embodiment, only in response to that the MEMC unit 120 performs the MEMC program 121, the MEMC unit 120 reads the correction correspondence table 122 from the storage unit 110 to load the correction correspondence table 122 to a temporary memory of the MEMC unit 120 for correction use.

In some embodiments, the correction correspondence table 122 and the information table 111 may each be independent. In other embodiments, the correction correspondence table 122 and the information table 111 may also be integrated as a single table. In one exemplary embodiment, the information table 111 has default feature values 113 of one or more specified pattern features and has the correction parameters. After the processing unit 130 generates the calibration parameters, the processing unit 130 adjusts corresponding ones of the corrections parameters in the information table 111 using the calibration parameters which have been generated, so as to form an information table which has been calibrated. Then, the processing unit 130 replaces (or updates) the information table 111 stored in the storage unit 110 with the information table which has been calibrated. In another exemplary embodiment, after the processing unit 130 generates the calibration parameters, the processing unit 130 records the calibration parameters that have been generated in the information table 111 as the correction parameters.

Figure 6:
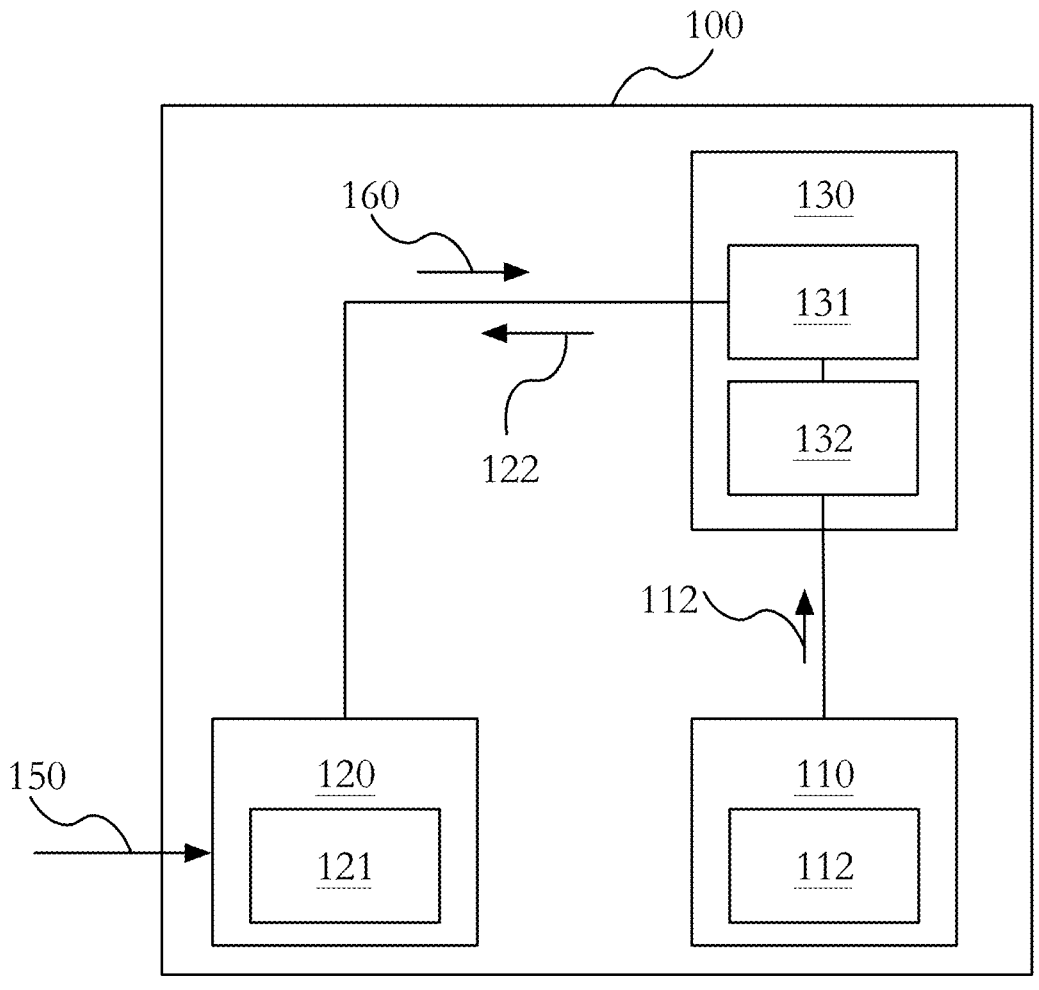
FIG. 6 illustrates a structural diagram of a system according to an embodiment.

In some embodiments, referring to FIG. 6, the processing unit 130 includes a comparison unit 131 and a calibration unit 132. The comparison unit 131 is connected to the MEMC unit 120 and the storage unit 110. The calibration unit 132 is connected to the comparison unit 131 and externally connected to the MEMC unit 120 and/or the storage unit 110.

The comparison unit 131 receives the testing feature values calculated by the MEMC unit 120 and calculates the difference value between each of the testing feature values and the corresponding one of the default feature values 113 in the default feature set 112. Next, the comparison unit 131 outputs the difference values corresponding to the testing feature values to the calibration unit 132. The calibration unit 132 determines whether the difference value corresponding to each of the testing feature values is greater than the threshold value. In response to that the difference value is greater than or equal to the threshold value, the calibration unit 132 performs a linear regression program in accordance with the testing feature set 160 and the default feature set 112 so as to generate the calibration parameter. Besides, the calibration unit 132 generates the calibration parameter of each of the testing feature values in accordance with the result of performing the linear regression program. In response to that the difference value is less than the threshold value, the calibration unit 132 does not generate the calibration parameter.

Figure 7:
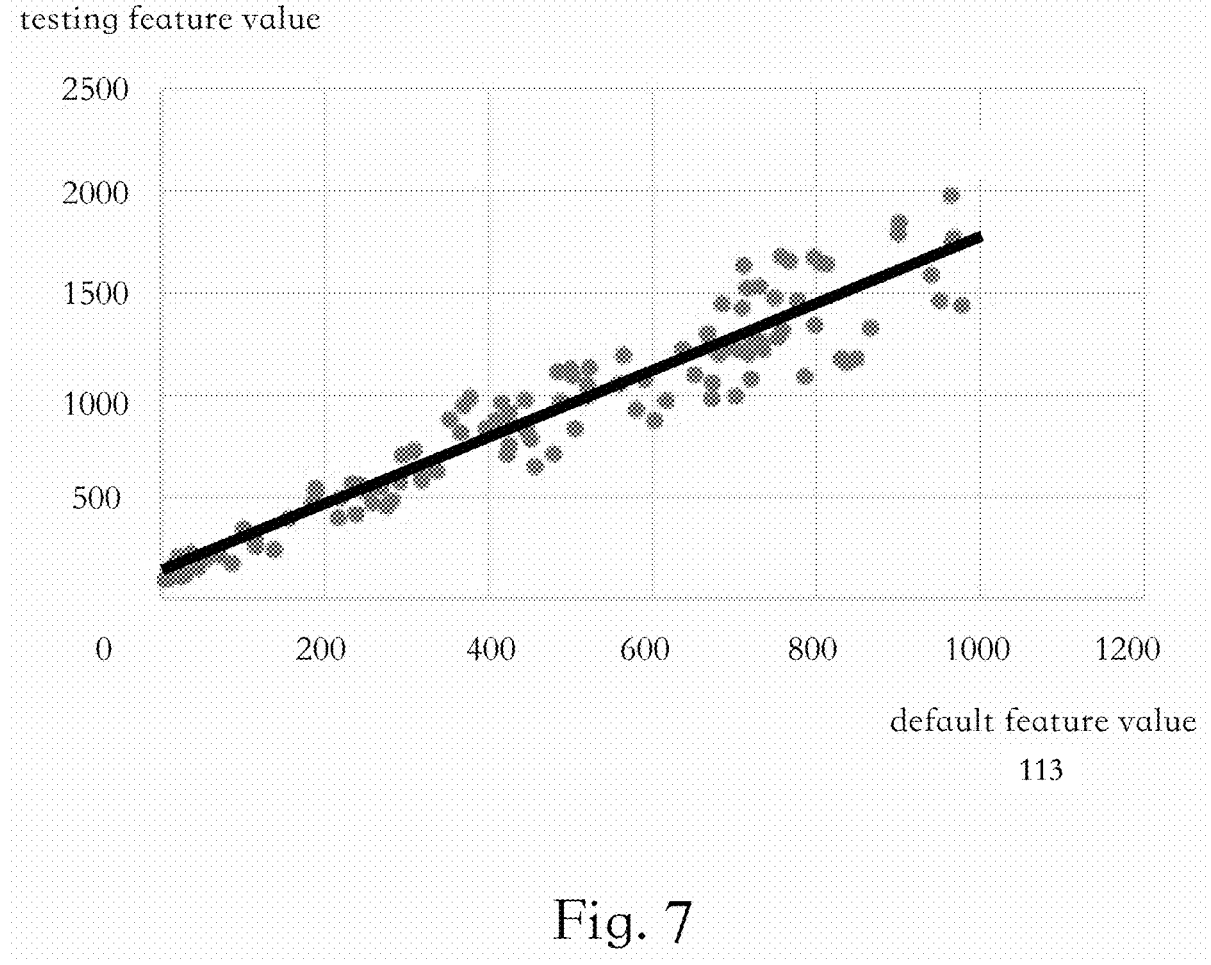
FIG. 7 illustrates a group point distribution chart of a default feature set to a temporary feature set according to an embodiment.

In some embodiments, the calibration unit 132 may select a portion of the feature values in the testing feature set 160 for generation. In particular, outliers (not denoted) in the testing feature set 160 are excluded. Therefore, an effect of the outliers on the compensation result is lowered. Specifically, in some embodiments, the calibration unit 132 performs the linear regression program on the testing feature set 160 and the default feature set 112 to obtain an initial group point distribution of the default feature values 113 to the testing feature values. In this embodiment, the initial group point distribution is constituted by a plurality of group points, and each of the group points is constituted by the testing feature values of one type of the specified pattern features and the default feature values 113 corresponding to the testing feature values. The calibration unit 132 removes the outliers in the initial group point distribution to form a temporary group point distribution constituted by the remaining group points (as shown in FIG. 7) and obtains the temporary feature set accordingly. In the temporary group point distribution, the testing feature values corresponding to the remaining group points form the temporary feature set. Next, the calibration unit 132 calculates a regression line fitted using the temporary group point distribution (such as the black bold line shown in FIG. 7) and obtains the calibration parameter accordingly. In some embodiments, the outliers can be determined using methods such as standard deviation, quartile, or box plot.

In some embodiments, the calibration unit 132 fits a set of regression line (such as the black bold line shown in FIG. 7) which conforms to the temporary group point distribution and a linear equation corresponding to the regression line through linear regression and least square method. Specifically, in some embodiments, the calibration unit 132 adopts the least square method to calculate the linear equation of the regression line fitted from the temporary group point distribution. Besides, the calibration unit 132 takes the coefficients of the linear equation as the calibration parameters.

Taking the group point distribution of FIG. 7 as an example, in FIG. 7, the X axis represents the default feature values 113, and the Y axis represents the testing feature values. The circular dots in FIG. 7 represent the foregoing difference values, and each of the difference values can correspond to one default feature value 113 on the X axis and one testing feature value on the Y axis.

An algorithm of the least square program is as shown in Equation 1. Through partial derivation on Equation 1, calculation formulas of the calibration parameters $(\alpha,\beta)$ can be derived, as shown in Equation 2 and Equation 3. By substituting the values in each of the group points into Equation 2 and Equation 3, i.e., by filling the default feature value 113 into $y_i$ and filling the testing feature value into $\hat{x}_i$, $\alpha$ can be calculated as 1.63, and $\beta$ can be calculated as 130.17. That is to say, for the group point shown in FIG. 7, the calibration unit 132 fits the regression line represented by Equation 4 through linear regression and least squares method. Therefore, the calibration unit 132 can obtain the calibration parameters as $(\alpha,\beta)=(1.63, 130.17)$.

$$\mathrm{Loss}(\alpha, \beta) = \sum_{i=1}^{n} (y_i - \hat{y}_i)^2 = \sum_{i=1}^{n} (y_i - (\alpha \cdot \hat{x}_i + \beta))^2 \quad \text{Equation 1}$$

$$\beta = \frac{\sum_{i=1}^{n} (x_i - \bar{x}_n)(y_i - \bar{y}_n)}{\sum_{i=1}^{n} (x_i - \bar{x}_n)^2} \quad \text{Equation 2}$$

$$\alpha = \bar{y}_n - \beta \cdot \bar{x}_n \quad \text{Equation 3}$$

$$y(i) = 1.63x_i + 130.17 \quad \text{Equation 4}$$

$$y = \alpha x + \beta \quad \text{Equation 5}$$

In some embodiments of the step S330, after the calibration unit 132 obtains the calibration parameters $(\alpha,\beta)$, the calibration unit 132 first temporarily stores the calibration parameters $(\alpha,\beta)$ that have been obtain in the storage unit 110. Then, the calibration unit 132 repeatedly calculates the difference values corresponding to other ones of the specified pattern features and calculates corresponding ones of the calibration parameters $(\alpha,\beta)$ accordingly, until the calibration parameters $(\alpha,\beta)$ corresponding to all of the specified pattern features have been obtained. Next, the calibration unit 132 compiles all of the calibration parameters $(\alpha,\beta)$ into the correction correspondence table 122 and then stores the correction correspondence table 122 in the storage unit 110.

After the compensation receives a new input video, under normal operation (i.e., normal mode), the MEMC unit 120 loads the correction correspondence table 122. The MEMC unit 120 performs correction on the output result of the MEMC program 121 in accordance with the correction correspondence table 122. In other words, in some embodiments, during the process of performing the MEMC program 121 on the input video by using the MEMC unit 120, the MEMC unit 120 first calculates an initial estimated feature value of each of the specified pattern features of each of the frames in the input video. Next, the MEMC unit 120 corrects the initial estimated feature values corresponding to the specified pattern features using the calibration parameters in the correction correspondence table 122 so as to obtain compensation feature values (i.e., a compensation parameter set) of the specified pattern features. Then, the MEMC unit 120 generates a compensated video 830 having at least one interpolated frame in accordance with the input video and the compensation parameter set.

In some embodiments, the MEMC unit corrects the output result of the MEMC program 121 using the correction algorithm shown in Equation 5. In Equation 5, x denotes the initial estimated feature value, $\alpha$ and $\beta$ are corresponding correction parameters in the correction correspondence table 122, and y denotes the compensation feature value. For example, during the process of performing the MEMC program 121 on the input video by using the MEMC unit 120, the MEMC unit 120 substitutes the initial estimated value which have been obtained into the x of Equation 5 and substitutes the corresponding calibration parameters $(\alpha,\beta)$ in the correction correspondence table 122 into Equation 5, so that the MEMC unit 120 can calculate the compensation feature value (y). Then, the MEMC unit 120 generates the interpolated frames in accordance with the compensation feature value (y) and the input video and interpolates the interpolated frames into the input video so as to form the compensated video 830. As shown in FIG. 8, the media player 810 (i.e., the video source 140) provides the calibrated video 150 for the compensation system 100. The compensation system 100 performs correction on the calibrated video 150 and generates the compensated video 830. The compensation system 100 outputs the compensated video 830 to the display 820.

As above, according to any of the foregoing embodiments, the compensation system 100 or the parameter calibration method thereof provide automatic calibration function of the MEMC technology. As a result, the correction parameter configured to correct the output result of the MEMC program 121 during normal operation can be generated. Consequently, MEMC algorithms (or chips applying the MEMC algorithms) in different devices can output identical compensation result. Further, working burden of developers can be reduced, and development cost can be lowered. Moreover, after firmware or software versions are updated, compensation results of the MEMC algorithms from different generations can approach consistency.

What is claimed is:

1. A motion estimation and motion compensation system with correction function, wherein the motion estimation and motion compensation system comprises:

a storage unit, configured to store a default feature set of at least one specified pattern feature;

a motion estimation and motion compensation system (MEMC) unit, configured to receive a calibrated video and perform an MEMC program on the calibrated video so as to fetch a testing feature set; and a processing unit, connected to the storage unit and the MEMC unit, and configured to generate a calibration parameter in accordance with a difference value between the default feature set and the testing feature set;

wherein, the MEMC unit is further configured to correct an output result of the MEMC program in accordance with the calibration parameter.

2. The motion estimation and motion compensation system according to claim 1, further comprising:

a video source, connected to the MEMC unit, and configured to output the calibrated video to the MEMC unit, wherein the calibrated video has at least one frame feature, and the MEMC unit fetches the testing feature set in accordance with the at least one frame feature of the calibrated video.

3. The motion estimation and motion compensation system according to claim 2, wherein the video source is an image generator, the at least one specified pattern feature comprises a plurality of specified pattern features, and the image generator generates a specified video having the specified pattern features as the calibrated video in accordance with a pattern feature table, wherein the specified pattern features are generated in sequence and have different extents of details.

4. The motion estimation and motion compensation system according to claim 2, wherein the video source is a media player, and the media player outputs a specified video as the calibrated video.

5. The motion estimation and motion compensation system according to claim 1, wherein the MEMC unit fetches at least one of the at least one specified pattern feature from the calibrated video, calculates a testing feature value of each fetched one of the at least one specified pattern feature, and records the testing feature value of each fetched one of the at least one specified pattern feature to the testing feature set.

6. The motion estimation and motion compensation system according to claim 5, wherein the storage unit stores an information table, the information table records the default feature set of the at least one specified pattern feature, and the processing unit comprises:

a comparison unit, connected to the MEMC unit, and configured to calculate a difference value between the testing feature value and the default feature set; and a calibration unit, connected to the comparison unit, and configured to verify the difference value in accordance with a threshold value, wherein in response to that the difference value is greater than the threshold value, the calibration unit performs a linear regression program in accordance with the testing feature set and the default feature set so as to generate the calibration parameter.

7. The motion estimation and motion compensation system according to claim 6, wherein the calibration unit first performs the linear regression program on the testing feature value and the default feature set so as to obtain a temporary feature set, and then performs a least squares program on the temporary feature set so as to generate the calibration parameter.

8. A parameter calibration method for motion estimation and motion compensation, wherein the parameter calibration method comprises:

storing a default feature set;

performing a motion estimation and motion compensation system (MEMC) program on a calibrated video so as to fetch a testing feature set;

generating a calibration parameter in accordance with a difference value between the default feature set and the testing feature set; and adjusting a correction parameter of the MEMC program in accordance with the calibration parameter.

9. The parameter calibration method for motion estimation and motion compensation according to claim 8, wherein the parameter calibration method further comprises:

connecting to a video source; and receiving the calibrated video provided by the video source, wherein the calibrated video has a specified pattern feature, and a default detail set comprises a default feature value of the specified pattern feature.

10. The parameter calibration method for motion estimation and motion compensation according to claim 8, wherein the parameter calibration method further comprises:

loading a pattern feature table; and generating a specified video having a plurality of specified pattern features as the calibrated video in accordance with a pattern feature table, wherein the specified pattern features are generated in sequence and have different extents of details.

11. The parameter calibration method for motion estimation and motion compensation according to claim 8, wherein the step of performing the MEMC program on the calibrated video so as to fetch the testing feature set comprises:

fetching at least one specified pattern feature from the calibrated video;

calculating a testing feature value of each of the at least one specified pattern feature; and establishing the testing feature set based on the testing feature value of the at least one specified pattern feature.

12. The parameter calibration method for motion estimation and motion compensation according to claim 8, wherein the default feature set is recorded in an information table, and the step of adjusting the correction parameter of the MEMC program in accordance with the calibration parameter comprises:

adjusting the information table in accordance with the calibration parameter so as to generate a correction correspondence table.

13. The parameter calibration method for motion estimation and motion compensation according to claim 8, wherein the parameter calibration method further comprises:

loading a pattern feature table; and generating a specified video having a plurality of specified pattern features as the calibrated video in accordance with the pattern feature table, wherein the specified pattern features are generated in sequence and have different extents of details.

14. The parameter calibration method for motion estimation and motion compensation according to claim 8, wherein the step of generating the calibration parameter in accordance with the difference value between the default feature set and the testing feature set comprises:

performing a linear regression program on the testing feature value and the default feature set so as to obtain a temporary feature set; and performing a least squares program on the temporary feature set so as to generate the calibration parameter.

15. The parameter calibration method for motion estimation and motion compensation according to claim 14, wherein the step of performing the linear regression program on the testing feature value and the default feature set so as to obtain the temporary feature set comprises:

forming an initial group point distribution using the testing feature set and the default feature set; and verifying and removing outliers in the initial group point distribution so as to obtain the temporary feature set.

16. The parameter calibration method for motion estimation and motion compensation according to claim 8, wherein the parameter calibration method further comprises:

receiving an input video; and performing the motion estimation and motion compensation system (MEMC) program on the input video in accordance with the calibration parameter so as to generate a compensated video.

\* \* \* \* \*